(12) United States Patent
Borella et al.

(10) Patent No.: US 6,768,743 B1
(45) Date of Patent: *Jul. 27, 2004

(54) METHOD AND SYSTEM FOR ADDRESS SERVER REDIRECTION FOR MULTIPLE ADDRESS NETWORKS

(75) Inventors: Michael S. Borella, Naperville, IL (US); David Grabelsky, Skokie, IL (US)

(73) Assignee: 3Com Corporation, Marlborough, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,616

(22) Filed: Oct. 26, 1999

(51) Int. Cl.[7] .......................... H04L 12/28; H04L 12/56
(52) U.S. Cl. ...................................... 370/401; 370/475
(58) Field of Search ................................. 370/351, 352, 370/353, 354, 355, 356, 400, 401, 410, 389, 475

(56) References Cited

U.S. PATENT DOCUMENTS

| | | | |
|---|---|---|---|
| 4,953,198 A | 8/1990 | Daly et al. | 379/61 |
| 5,159,592 A | 10/1992 | Perkins | 370/85.7 |
| 5,227,778 A | 7/1993 | Vacon et al. | 340/825.52 |
| 5,327,365 A | 7/1994 | Fujisaki et al. | 364/717 |

(List continued on next page.)

FOREIGN PATENT DOCUMENTS

WO     WO 01/31888 A1    5/2001     ......... H04L/29/06

OTHER PUBLICATIONS

Mar. 3, 1999, Microsoft Corporation, "Getting Ready for Microsoft Windows 2000", Glossary Pages.*

(List continued on next page.)

*Primary Examiner*—Ajit Patel
*Assistant Examiner*—Chirag Shah
(74) *Attorney, Agent, or Firm*—McDonnell Boehnen Hulbert & Berghoff

(57) ABSTRACT

A method and system for address server redirection for multiple address networks. A primary network address and an address of a secondary network address server are requested by a network device from a primary network address server. The address of the secondary network address server is requested in an option field in a request message sent to the primary network address server to request a primary network address. The request message may be sent through one or more routers. The primary network address is used by a network device to communicate with other network devices on a first network. The secondary network address is used by the network device to communicate with other network devices on a second network. For example, the primary network address may be a private Internet Protocol address or an Internet Protocol version-6 address and the secondary network address may be a public Internet Protocol address or an Internet Protocol version-4 address. The method and system may also allow existing primary network address servers such as Dynamic Host Configuration Protocol ("DHCP") servers, and new secondary network address servers, such as Distributed Network Address Translation ("DNAT") or Realm Specific Internet Protocol ("RSIP") servers, to be reached via routers without any changes to any existing routers in existing networks. The method and system can be used to acquire virtually any type of primary network addresses and secondary network address from virtually any type of primary network address server or secondary network address servers. The method and system allow multiple types of network addresses for multiple address networks to be allocated.

24 Claims, 6 Drawing Sheets

U.S. PATENT DOCUMENTS

| | | | |
|---|---|---|---|
| 5,497,339 A | 3/1996 | Bernard | 364/705.5 |
| 5,526,353 A | 6/1996 | Henley et al. | 370/60.1 |
| 5,526,489 A | 6/1996 | Nilakantan et al. | 395/200.02 |
| 5,550,984 A | 8/1996 | Gelb | 395/200.17 |
| 5,604,737 A | 2/1997 | Iwami et al. | 370/352 |
| 5,606,594 A | 2/1997 | Register et al. | 379/58 |
| 5,636,216 A | 6/1997 | Fox et al. | 370/402 |
| 5,654,957 A | 8/1997 | Koyama | 370/355 |
| 5,708,655 A | 1/1998 | Toth et al. | 370/313 |
| 5,737,333 A | 4/1998 | Civanlar et al. | 370/352 |
| 5,742,596 A | 4/1998 | Baratz et al. | 370/356 |
| 5,754,547 A | 5/1998 | Nakazawa | 370/401 |
| 5,793,657 A | 8/1998 | Nemoto | 364/717.01 |
| 5,793,763 A | 8/1998 | Mayes et al. | 370/389 |
| 5,812,819 A | 9/1998 | Rodwin et al. | 395/500 |
| 5,835,723 A | 11/1998 | Andrews et al. | 395/200.56 |
| 5,862,331 A | 1/1999 | Herriot | 395/200.49 |
| 5,867,495 A | 2/1999 | Elliott et al. | 370/352 |
| 5,867,660 A | 2/1999 | Schmidt et al. | 395/200.57 |
| 5,872,847 A | 2/1999 | Boyle et al. | 380/25 |
| 5,889,774 A | 3/1999 | Mirashrafi et al. | 370/352 |
| 5,892,924 A | 4/1999 | Lyon et al. | 395/200.75 |
| 5,915,008 A | 6/1999 | Dulman | 379/201 |
| 5,933,778 A | 8/1999 | Buhrmann et al. | 455/461 |
| 5,950,195 A | 9/1999 | Stockwell et al. | 707/4 |
| 6,011,782 A | 1/2000 | DeSimone et al. | 370/260 |
| 6,038,233 A * | 3/2000 | Hamamoto et al. | 370/401 |
| 6,055,236 A * | 4/2000 | Nessett et al. | 370/389 |
| 6,055,561 A | 4/2000 | Feldman et al. | 709/200 |
| 6,058,421 A | 5/2000 | Fijolek et al. | 709/225 |
| 6,079,021 A | 6/2000 | Abadi et al. | 713/202 |
| 6,101,189 A | 8/2000 | Tsuruoka | 370/401 |
| 6,101,543 A | 8/2000 | Alden et al. | 709/229 |
| 6,104,711 A | 8/2000 | Voit | 370/352 |
| 6,115,751 A | 9/2000 | Tam et al. | 709/240 |
| 6,118,784 A * | 9/2000 | Tsuchiya et al. | 370/401 |
| 6,128,664 A * | 10/2000 | Yanagidate et al. | 709/228 |
| 6,134,591 A | 10/2000 | Nickles | 709/229 |
| 6,137,791 A | 10/2000 | Frid et al. | 370/352 |
| 6,157,950 A | 12/2000 | Krishnan | 709/223 |
| 6,172,986 B1 | 1/2001 | Watanuki et al. | 370/466 |
| 6,185,184 B1 | 2/2001 | Mattaway et al. | 370/230 |
| 6,195,705 B1 | 2/2001 | Leung | 709/245 |
| 6,212,183 B1 | 4/2001 | Wilford | 370/392 |
| 6,212,563 B1 | 4/2001 | Beser | 709/227 |
| 6,249,820 B1 | 6/2001 | Dobbins et al. | 709/238 |
| 6,266,707 B1 | 7/2001 | Boden et al. | 709/245 |
| 6,269,099 B1 * | 7/2001 | Borella et al. | 370/389 |
| 6,331,984 B1 * | 12/2001 | Luciani | 370/401 |
| 6,353,614 B1 * | 3/2002 | Borella et al. | 370/389 |
| 6,353,891 B1 | 3/2002 | Borella et al. | 713/201 |
| 6,480,508 B1 * | 11/2002 | Mwikalo et al. | 370/475 |
| 2002/0159478 A1 * | 10/2002 | Watanki et al. | 370/466 |

OTHER PUBLICATIONS

G. Montene, Internet Engineering Task Force, Internet Draft, "Negotiated Address Reuse" (NAR), <draft–montenegro–aatn–nar–00.txt>, May 1998, Pgs. 1 to 22.

George Tsirtsis, Alan O'Neill, Internet Engineering Task Force, Internet Draft, "NAT Bypass for End 2 End 'Sensitive' Applications," <draft–tsirtsis–nat–bypass–00.txt>, Jan. 1998, Pgs. 1 to 5.

George Tsirtsis, Pyda Srishuresh, Internet Engineering Task Force, Internet Draft, "Network Address Translation—Protocol Translation" (NAT–PT), <draft–ietf–ngtrans–natpt–04.txt>, Jan. 1999, Pgs. 1 to 13.

Jeffrey Lo, K. Taniguchi, Internet Engineering Task Force, Internet Draft, "IP Host Network Address (and port) Translation," <draft–ietf–nat–hnat–00.txt>, Nov. 1998, Pgs. 1 to 13.

Michael Borella, David Grabelsky, Ikhlaq Sidhu, Brain Petry, Internet Engineering Task Force, Internet Draft, "Distributed Network Address Translation," <draft–borella–aatn–dnat–01.txt>, Oct. 1998, Pgs. 1 to 21.

P. Srisuresh, G. Tsirtsis, P. Akkiraju, A. Heffernan, Internet Engineering Task Force, Internet Draft, "DNS Extensions to Network Address Translators" ($DNS_{13}$ ALG), <draft–ietf–nat–dns–alg–01.txt>, Oct. 1998, Pgs. 1 to 24.

P. Srisuresh, Internet Engineering Task Force, Internet Draft, "Security for IP Network Address Translator (NAT) Domains," <draft–ietf–nat–security–00.txt>, Nov. 1998, Pgs. 1 to 11.

P. Srisuresh, K. Eg, Internet Engineering Task Force, Internet Draft, "The IP Network Address Translator" (NAT), <draft–rfced–info–srisuresh–05.txt>, Feb. 1998, Pgs. 1 to 24.

P. Srisuresh, K. Egev, Internet Engineering Task Force, Internet Draft, "Traditional IP Network Address Translator (Traditional NAT)," <draft–ietf–nat–traditional–01.txt>, Oct. 1998, Pgs. 1 to 17.

P. Srisuresh, Matt Holdrege, Internet Engineering Task Force, Internet Draft, "IP Network Address Translator (NAT) Terminology and Considerations," <draft–ietf–nat–terminology–01.txt>, Oct. 1998, Pgs. 1 to 28.

Praveen Akkiraju, Yakov Rekhter, Internet Engineering Task Force, Internet Draft, "A Multihoming Solution Using NATs" <draft–akkiraju–nat–multihoming–00.txt>, Nov. 1998, Pgs. 1 to 32.

R. G. Moskowitz, Internet Engineering Task Force, Internet Draft, "Network Address Translation Issues with IPsec," <draft–moskowitz–net66–vpn–00.txt>, Feb. 6, 1998, Pg. 1 to 8.

R. Thay, N. Doraswa and R. Gle, Internet Engineering Task Force, Internet Draft, "IP Security," <draft–ietf–ipsec–doc–roadmap–02.txt>, Nov. 1997, Pgs. 1 to 12.

T. Hain, Internet Engineering Task Force, Internet Draft, "Architectural Implications of NAT," <draft–iab–nat–implications–02.txt>, Oct. 1998, Pgs. 1 to 14.

W. T. Teo, S. W. Yeow, R. Singh, Internet Engineering Task Force, Internet Draft, "IP Relocation Through Twice Network Address Translators," <draft–ietf–nat–rnat–00.txt>, Feb. 1999, Pgs. 1 to 20.

W. T. Teo, S.W. Yeow, R. Singh, Internet Engineering Task Force, Internet Draft, "Reverse Twice Network Address Translators (RAT)," <draft–teoyeow–mip–rat–01.txt>, Dec. 1998, Pgs, 1 to 20.

W. T. Teo, Y. Li, Internet Engineering Task Force, Internet Draft, "Mobile IP Extension for Private Internets Support," <draft–teoyli–mobileip–mvpn–02.txt>, Feb. 1999, Pgs. 1 to 24.

Yakov Rekhter, Internet Engineering Task Force, Internet Draft, "Implications of NATs on the TCP/IP Architecture," <draft–ietf–nat–arch–implications–00.txt>, Feb. 1999, Pgs. 1 to 7.

K. Egevang, and P. Francis, Internet Engineering Task Force, ("IETF"), Request for Comments ("RFC") RFC–1631, "The IP Network Address Translator (NAT)", May 1994, pp. 1–10.

Borella, Michael, *Technology Update—Protocol Helps Stretch IPv4 Addresses*, "Network World", vol. 17, No. 3, Jan. 17, 2000, p. 43.

Kent, Stephen, *Evaluating Certification Authority Security*, Aerospace Conference, 1998 IEEE, Online, vol. 4, pp. 319–327 (Mar. 21–23, 1998).

Thayer, Rodney, *Bulletproof IP With Authentication and Encryption IPSec Adds a Layer of Armor to IP*, Data Communications, vol. 26, No. 16, pp. 55–58, 60 (Nov. 21, 1997).

Borella, M., Grabelsky, D., Lo, J., Tuniguchi, K., Internet Engineering Task Force, Internet Draft, "Realm Specific IP: Protocol Specification <draft–ietf–nat–rsip–protocol–.06.txt>", Mar. 2000, Pgs. 1–48.

Borella, M., Grabelsky, D., Lo, J., Tuniguchi, K., Internet Engineering Task Force, Internet Draft, "Realm Specific IP: Protocol Specification <draft–ietf–nat–rsip–protocol–.07.txt>", Jul. 2000, Pgs. 1–49.

Montenegro, G., Internet Engineering Task Force, Internet Draft, "RSIP Support for End–to–End IPsec," <draft–ietf–nat–rsip–ipsec–04.txt>, Jul. 2000, Pgs. 1 to 17.

Borella, M., Lo, J., Grabelsky, D., Montenegro, G., Internet Engineering Task Force, Internet Draft, "Realm Specific IP: Framework <draft–ietf–nat–rsip–framework–.05.txt>", Jul. 2000, Pgs. 1–30.

Borella, M., Montenegro, G., *RSIP: Address Sharing with End–To–End Security*, Usenix Conference, San Francisco, California, Mar. 9, 2000, pgs. 1–9.

Handley, M., et al. *SIP: Session Initiation Protocol*, Network Working Group, Request for Comments 2543, Mar. 1999, Pgs. 1 to 153.

ITU–T Recommendation H.225.0, *Call Signaling Protocols and Media Stream Packetization for Packet–Based Multimedia Communication Systems*, Series H: Audiovisual and Multimedia Systems—Infrastructure of Audiovisual Services—Transmission Multiplexing and Synchronization, (Feb., 1998).

ITU–T Recommendation H.323, *Packet–Based Multimedia Communications Systems*, Series H: Audiovisual and Multimedia Systems—Infrastructure of Audiovisual Services—Systems and Terminal Equipment for Audiovisual Services, (Feb. 1998).

McCanne et al., "The BSD Packet Filter: A New Architecture for User–Level Packet Capture," Proceedings of the 1993 Winter USENIX Technical Conference (Jan. 1993).

Postel, J., *User Datagram Protocol*, Request for Comments 768, Aug. 1980, pgs. 1 to 3.

Postel, J., *Internet Protocol*, Request for Comments 791, Sep. 1981, pgs. 1 to 45.

Postel, J., *Internet Control Message Protocol*, Request for Comments 792, Sep. 1981, pgs. 1 to 21.

Postel, J., *Transmission Control Protocol*, Request for Comments 793, Sep. 1981, pgs. i to 84.

Postel, J., *File Transfer Protocol (FTP)*, Request for Comments 959, Oct. 1985, pgs. 1 to 69.

Jacobson, V., *TCP Extensions for High Performance*, Request for Comments 1323, May 1992, pgs. 1 to 37.

Droms, R., *Dynamic Host Configuration Protocol*, Request for Comments 2131, Mar. 1997, pgs. 1 to 45.

Stevens, W., *Advanced Sockets API for IPv6*, Request for Comments 2292, Feb. 1998, pgs. 1 to 67.

Gilligan, R. et al., *Basic Socket Interface Extensions of IPv6*, Request for Comments 2553, Mar. 1999, pgs. 1 to 41.

Srisuresh, P.,et al., *IP Network Address Translator (NAT) Terminology and Considerations*, Request for Comments 2663, Aug. 1999, Pgs. 1 to 30.

Maurice J. Bach, The Design of the Unix Operating System, Prentice Hall Software Series, 1986, pp. 382–390.

"Cisco IOS Release 12.0 Network Protocols Configuration Guide, Part 1", Configuring IP Addressing, Cisco Systems, 1998, pp. P1C–7 to P1C–58.

Durand, Alain, *Deploying Ipv6*, IEEE Internet Computing, http://computer.org/internet, Jan.–Feb. 2001, pgs. 79–81.

3COM SIP Solutions 1.0 benefits brochure. (4 total pages).

Sidhu, Ikhlaq and Bezaitis, Andrew, Eat or be eaten, www.americasnetwork.com/issues/99issues/991101/991191_eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

Dalgic, Ismail; Borella, Michael; Dean, Rick; Grabiec, Jacek; Mahler, Jerry; Shuster, Guido; and Sidhu, Ikhlaq, True Number Portability and Advanced Call Screening in a SIP–Based IP Telephony System, *IEEE Communications Magazine*, vol. 37, No. 7, Jul. 1999, pp. 96–101. (8 total pages).

Handley/Schulzrinne/Schooler/Rosenberg, SIP: Session Initiation Protocol, Internet Engineering Task Force, draft–ietf–sip–rfc2543bis–02.ps. Sep. 4, 2000. (131 pages).

Borella, M., Lo, J., Grabelsky, D., Montenegro, G., IETF Proceedings presentation, "Realm Specific IP: Protocol Specification <draft–nat–rsip–protocol–00.txt>", Apr. 9, 1999 (13 pages).

Marson, Carolyn Duffy, The Next Best Things to Ipv6? Network World Fusion at http://www.nbwfusion.com/news/1999/0920ipv6.html, Mar. 29, 2000, pgs. 1–3.

Borella, M., Lo, J., Grabelsky, D., Montenegro, G., Internet Engineering Task Force, Internet Draft, "Realm Specific IP: Framework <draft–nat–rsip–framework–04.txt>", Mar. 2000, Pgs. 1–30.

IETF Mar. 1999 Proceedings, 2.7.10 Network Address Translators (nat), pgs. 1–13.

Rosenberg, Jonathan D. and Shockey, Richard, The Session Initiation Protocol (SIP): A Key Component for Internet Telephony, ComputerTelephony.com, Jun. 2000, pp. 124–139.

Fenner, W., *Internet Group Management Protocol Version 2*, RFC 2236, Nov. 1997, pgs. 1–24.

Mogul, J. et al., *"Internet Standard Subnetting Procedure"*, RFC 950, Aug., 1985, pgs. 1–18.

Schulzrinne et al., *"RTP: A Transport Protocol for Real–Time Applications"*, RFC 1889, pgs. 1–75.

Privat, Jermone, "Double Phase DHCP Configuration", <draft–privat–dhc–doublephase–01.txt>, Internet Engineering Task Force, Sep. 1999, pps. 1–4.

Maughan, D. et al., "Internet Security Association and Key Management Protocol", RFC 2408, Nov. 1998, pps. 1–86.

Karn, P., "Photuris Session–Key Management Protocol", RFC 2522, Mar. 1999, pps. 1–58.

"*Randon Number Generators*", Computational Science Education Project, 1991, 1992, 1993, 1994, and 1995.

Foster, Ian, "*10 Random Numbers*", 1995.

Borella, Michael et al., "Realm Specific IP: Protocol Specification", <draft–ietf–nat–rsip–protocol–02.txt>, Internet Draft, Aug. 1999, pps. 1–27.

Gilligan, R. et al., "Transistion Mechanisms for IPv6 Hosts and Routers", RFCV 1933, Apr. 1996, pps. 1–22.

Afifi, H. et al., "Method for IPv4–Ipv6 Transition", Proceedings IEEE International Symposium on Computers and Communications, Jul. 6–8, 1999, pps. 478–484.

* cited by examiner

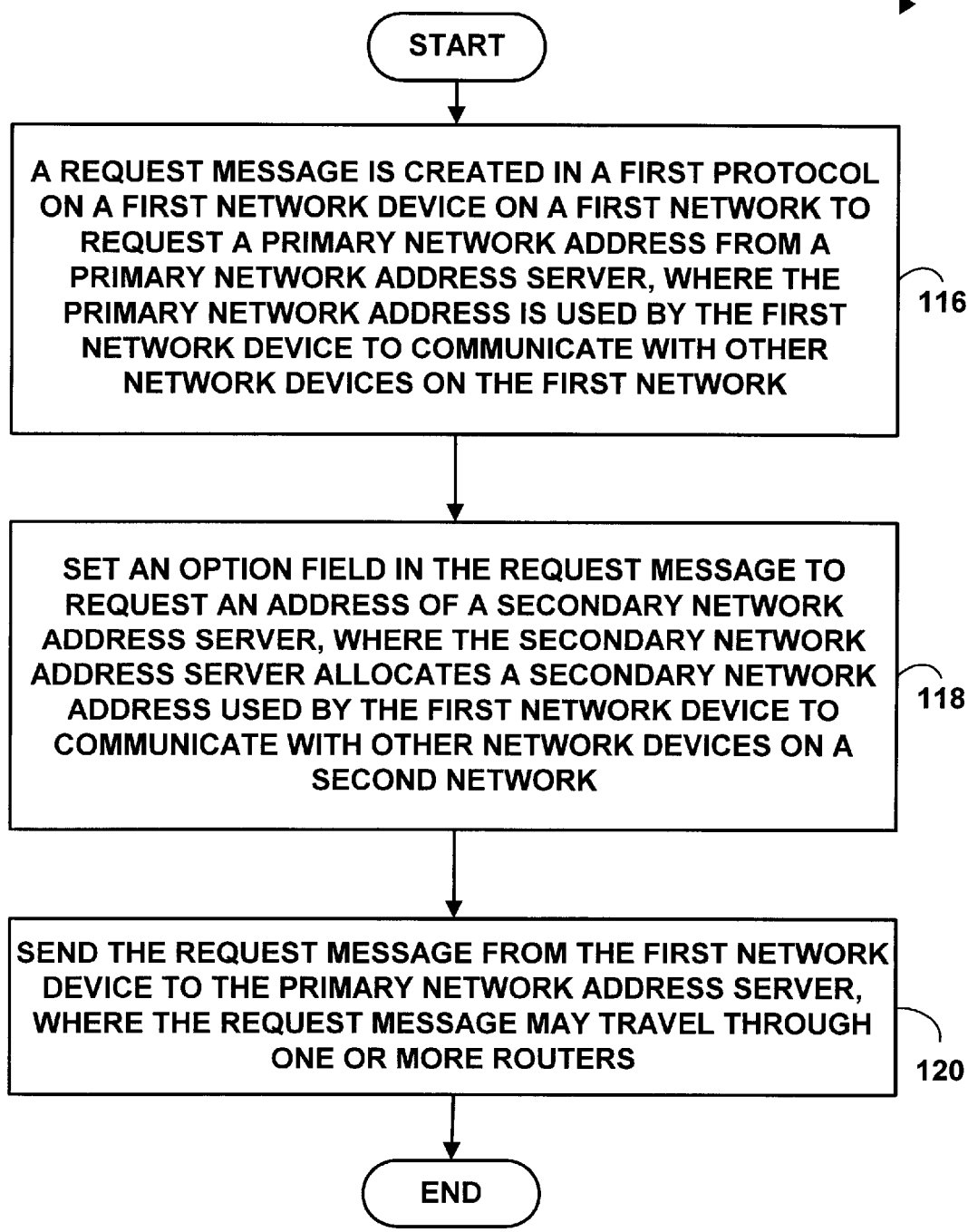

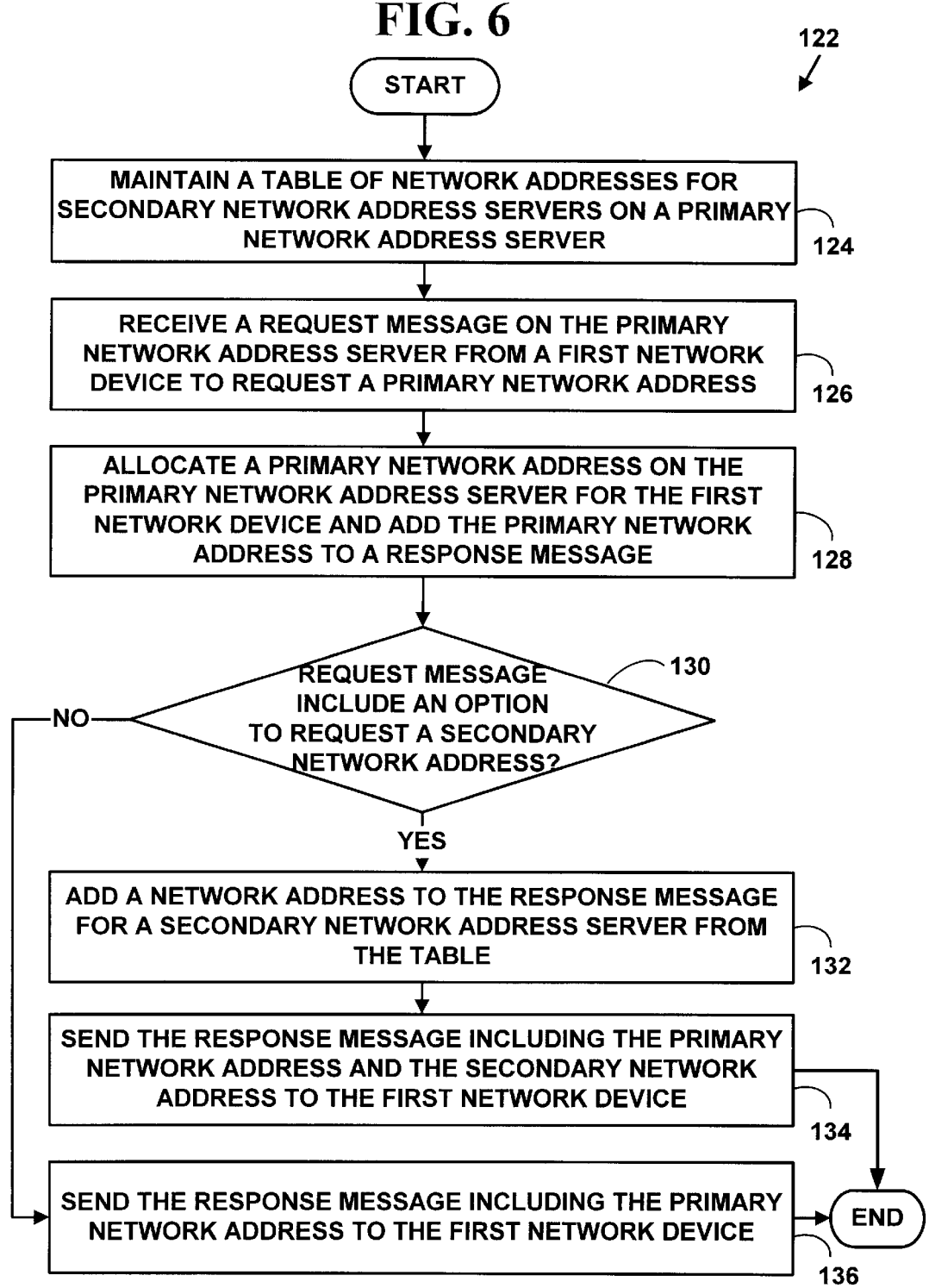

METHOD AND SYSTEM FOR ADDRESS SERVER REDIRECTION FOR MULTIPLE ADDRESS NETWORKS

FIELD OF INVENTION

This invention relates to computer networks. More specifically, it relates to a method and system for address server redirection for multiple network address networks.

BACKGROUND OF THE INVENTION

The Internet Protocol ("IP") is an addressing protocol designed to facilitate the routing of traffic within a network or between networks. The Internet Protocol is used on many computer networks including the Internet, intranets and other networks. Current versions of Internet Protocol such as Internet Protocol version-4 ("IPv4") are becoming obsolete because of limited address space. With a 32-bit address-field, it is possible to assign $2_{32}$ different addresses, which is 4,294,967,296, or greater than 4 billion globally unique addresses.

However, with the explosive growth of the Internet and intranets, Internet Protocol addresses using a 32-bit address-field may soon be exhausted. Internet Protocol version-6 ("IPv6") proposes the use of a 128-bit address-field for Internet Protocol addresses. However, a large number of legacy networks including a large number of Internet sub-nets will still be using older versions for Internet Protocol with a 32-bit address space for many years to come. As is known in the art, a subnet is smaller of part of a larger network using a similar network addressing scheme.

Network Address Translation ("NAT") has been proposed to extend the lifetime of Internet Protocol version 4 by allowing subnets with private Internet Protocol addresses to exist behind a single or small number of globally unique Internet Protocol addresses (see e.g., Internet Engineering Task Force ("IETF") RFC 2663, "IP Network Address Translator ("NAT") Terminology and Considerations," by P. Srisuresh and M. Holdrege, August 1999). Each private host uses a single global Internet Protocol address is used for communication with external networks such as the Internet.

As is known in the art, the Internet Engineering Task Force ("IETF") has assigned three sets of private Internet Protocol addresses: 10.0.0.0/8, 172.16.0.0/12 and 192.168.0.0/16. The number after the "/" indicates a number of bits used as a private network identifier. For example, the "/8" indicates that the first eight bits are used as a private network identifier. A network address represented as "network address/n-network bits" indicates that the first n-network bits represent a network identifier. The number of bits remaining represent the number of available host network addresses. For example, if a total of 32 bits are used for a network address (e.g., 32-bits for IPv4 addresses) and a "network address/8" notation is used, then 32−8=24 bits remain for host network addresses. In this example at most 224 host network addresses are available. Thus, the three sets of private Internet Protocol addresses: 10.0.0.0/8, 172.16.0.0/12 and 192.168.0.0/16 include at most $2_{24}$, $2_{20}$, and $2_{16}$ addresses respectively. A private network may use any of these addresses without consulting any official Internet administrative entity.

Internally, a subnet may use local private addressing. Local private addressing may be any addressing scheme that is different from the public Internet Protocol addressing. The local addresses on a subnet are not available to the external, global Internet. When a device or node using local addressing desires to communicate with the external world, its local address is translated to a common external Internet Protocol address used for communication with an external network by a network address translation device. That is, network address translation allows one or more global Internet Protocol addresses to be shared among a larger number of network devices using local private addresses.

There are several problems associated with using network address translation to extend the life of the Internet Protocol. Network address translation interferes with the end-to-end routing principal of the Internet that recommends that packets flow end-to-end between network devices without changing the contents of any packet along a transmission route (see e.g., "Routing in the Internet," by C. Huitema, Prentice Hall, 1995, ISBN 0-131-321-927).

Current versions of network address translation replace a local network address in a data packet header with an external global network address on outbound traffic, and replace an external global network address in a data packet header with a local private network address on inbound traffic. This type of address translation is computationally expensive, causes security problems by preventing certain types of encryption from being used, or breaks a number of existing applications in a network that cannot coexist with network address translation (e.g., File Transfer Protocol ("FTP")).

Current versions of network address translation may not gracefully scale beyond a small subnet containing a few dozen nodes or devices because of the computational and other resources required. Network address translation potentially requires support for many different application layer internal network protocols be specifically programmed into a translation mechanism such as a network address translation router.

Computational burdens placed on a network address translation router may be significant and degrade network performance, especially if several network address translation-enabled sub-networks share the same network address translation router. In a worst case scenario, a network address translation router translates every inbound and outbound data packet.

Some of the problems associated with network address translation of private network addresses into public network addresses have been overcome with Distributed Network Address Translation ("DNAT") described in co-pending applications Ser. No. 09/035,600, 09/270,967 and 09/271,025 assigned to the same Assignee as the present application. See also "Distributed Network Address Translation", by Michael Borella, David Grabelsky, Ikhlaq Sidhu, and Brian Petry, IETF Internet Draft, <draft-borella-aatn-dnat-01.txt>, October 1998. Distributed Network Address Translation is also called "Realm Specific Internet Protocol" ("RSIP") by the IETF. For more information on Realm Specific Internet Protocol see "Realm Specific IP Framework," by M. Borella and J. Lo, IETF draft, <draft-ieft-nat-rsip-framework-02.txt>, October 1999, and "Realm Specific IP: Protocol Specification," by M. Borella and J. Lo, IETF draft, <draft-ietf-nat-rsip-protocol-02.txt>, August 1999.

For the Distributed Network Address Translation methods described in the co-pending applications, network devices request a set of locally unique ports with a Distributed Network Address Translation Protocol called a "Port Allocation Protocol" ("PAP") from a Distributed Network Address Translation server for external communications with a public network like the Internet. A network device on a private network replaces default or ephemeral ports (e.g., such as Transmission Control Protocol or User Datagram Protocol) with the locally unique ports. The network device uses a combination network address including a locally unique port and a common external network address (e.g., an IP address) for the Distributed Network Address Translation server for communications with the external networks. The network devices use private network addresses for local communications on the private network.

A Distributed Network Address Translation server maintains a port-to-private network address table as locally unique ports are allocated to network devices. Network devices send data packets to external networks using a combination network address including a locally unique port and the common external network address via the Distributed Network Address Translation server. For inbound data packets from an external network, the Distributed Network Address Translation server uses the port-to-private network address table to route data packets back to the appropriate network device on the private network.

It is becoming commonplace for private stub network or subnets to be "multiple address networks." Multiple address networks are networks in which more than one type of network address is used, or two or more addresses of the same type are used. For example, a subnet may use private Internet Protocol addresses for local communications and use public, globally routable Internet Protocol addresses for communications with external public Internet Protocol networks such as the Internet. As another example, a private subnet may use older 32-bit Internet Protocol version-4 addresses to communicate with external networks, and use the new 128-bit Internet Protocol version-6 addresses to communicate on a local subnet. Networks using Distributed Network Address Translation or Realm Specific Internet Protocol are also examples of multiple address networks.

A network device on a multiple address network needs to obtain at least two network addresses. A first network address is a primary network address used for local communications with other network devices on a private subnet and a secondary network address is a secondary network address used for remote communications on public networks like the Internet.

As is known in the art, Dynamic Host Configuration Protocol ("DHCP") servers are often used to allocate primary Internet Protocol addresses and configuration parameters such as a netmask, a gateway router, a Domain Name Server ("DNS") and other parameters for network devices on a private network. The Dynamic Host Configuration Protocol is used to dynamically allocate network addresses and dynamically obtain configuration parameters. If the Dynamic Host Configuration Protocol is not used, then network addresses and configuration parameters have to be statically assigned to network devices connected to a network. Static assignment of network address and configuration parameters limits the ability of a network device to move to a new network or a new subnet. The Dynamic Host Configuration Protocol allows a network device to dynamically broadcast a message to a Dynamic Host Configuration Protocol server whenever it moves to a new network or subnet requesting a network address and configuration parameters.

Another secondary protocol, such as a Distributed Network Address protocol (e.g., the "Port Allocation Protocol") or a Realm Specific Internet Protocol may be used to allocate secondary network addresses or translation ports that are used to translate private or local Internet Protocol addresses into public, external Internet Protocol addresses.

However, there are several problems associated with allocating multiple addresses with multiple protocols for multiple address networks. One problem is that a subnet typically will use a Dynamic Host Configuration Protocol server to allocate primary Internet Protocol addresses and another server to allocate secondary network addresses, such as those allocated for Distributed Network Address Translation or Realm Specific Internet Protocol.

In many instances a network device requesting a primary and a secondary network address is on a different subnet than the primary network address server or the secondary network address server. The subnets are typically connected by a router. As is known in the art, a router translates differences between network protocols and routes data packets to an appropriate device on a network.

In most private networks, a router will relay Dynamic Host Configuration Protocol messages since this protocol is well known in the networking arts and most routers recognize Dynamic Host Configuration Protocol messages and implement a Dynamic Host Configuration Protocol layer. However, most routers do not recognize secondary network address request messages without changes to the router software. Thus, a network device can request a primary network address, but may have trouble requesting a secondary network address from a secondary network address server.

There have been a number of proposed solutions to this problem. First, a subnet could require that every network device connected to the subnet use a configuration file that includes the address of a designated secondary network address server. However, this would require explicit configuration of each network device. For mobile network devices such as laptop computers and personal digital assistants that may be attached to many different subnets, multiple configuration files may have to be maintained. This places an unacceptable burden on network administrator's and makes it difficult for a user to ensure the proper configuration file is used on the proper subnet.

Another solution is to require that a protocol used to request secondary network addresses use BOOT strap Protocol ("BOOTP") ports. As is known in the art, BOOTP is a protocol used to initialize and boot network devices on a network. The format of Dynamic Host Configuration Protocol messages is based on the format of BOOTP messages. The Dynamic Host Configuration protocol is typically considered an extension of the BOOTP protocol. Using BOOTP ports would allow Dynamic Host Configuration Protocol-like stateless configuration and message relaying of secondary network address protocols in a router. However, this solution causes potentially serious interoperability issues. For example, network devices, the Dynamic Host Configuration Protocol server and a secondary network address server may contend for the same BOOTP ports at the same time causing collisions, confusion and other network problems. In addition, a secondary address server message broadcast to a BOOTP port on another subnet may not be forwarded by a router to the subnet.

Another solution is to define a secondary network address protocol router relay function for routers on a subnet. This solution would also allow Dynamic Host Configuration Protocol-like stateless configuration and message relaying for secondary network address protocols in the router. However, this would require modifications to the software, firmware and/or hardware on a huge installed based of routers from various manufacturers. This solution would expensive and require the cooperation of a number of number of network owners and router manufacturers, and thus is not feasible given the large amount of routers used in today's networks.

Thus, it is desirable to provide a solution to the problem of allocating multiple types of network addresses for multiple address networks. The solution should allow existing Dynamic Host Configuration Protocol servers and secondary network address servers to be reached via routers without any changes to any existing routers in existing networks.

SUMMARY OF THE INVENTION

In accordance with preferred embodiments of the present invention, some of the problems associated with allocating multiple addresses with multiple protocols for multiple address networks overcome. A method and system for address server redirect for multiple address networks is provided.

One aspect of the invention includes a method for address server redirect from a client network device. The method includes requesting a primary network address and an address of a secondary network address server from a primary network address server. The address of the secondary network address server is requested in an option field in a message sent to the primary network address server to request a primary network address. The primary network address is used by a network device to communicate with other network devices on a first network. The secondary network address is used by the network device to communicate with other network devices on a second network. A message used to request a primary and a secondary network addresses may travel through one or more routers on the first network.

Another aspect of the invention includes a method for address server redirect from a network address server. A primary network address server allocates a primary network address to a network device. The primary network address server also conducts a test to determine if the network device is requesting an address of a secondary network address server in an option field of a message used to request the primary network address. If the network device is requesting an address of a secondary network address server in an option field, the primary network address server selects an address of a secondary network address server from a table. The secondary network address is returned to the network device in a same message as a primary network address.

Another aspect of the invention includes a system for address server redirect. The system includes a primary network address server, a secondary network address server and a client network device. The primary network address server is used for allocating a primary network address and for supplying a network address of a secondary network address server. The primary network address is used by a network device to communicate with other network devices on a first network. The secondary network address server is used to request a secondary network address that is used by a network device to communicate with other network devices on a second network. The client network device is used for communicating with other network devices on a first network using a primary network address allocated by the primary network address server and for communicating with other network devices on a second network using a secondary network address allocated by the secondary network address server.

For example, in one exemplary preferred embodiment of the present invention, the primary network address is a private Internet Protocol address and the secondary network address is a public Internet Protocol address. In another exemplary preferred embodiment of the present invention, the primary network address is an Internet Protocol version-6 address and the secondary network address is an Internet Protocol version-4 address.

In one exemplary preferred embodiment of the present invention, the primary Internet Protocol address is allocated by a Dynamic Host Configuration Protocol server and the secondary network address is allocated by a Distributed Network Address Translation protocol or a Realm Specific Internet Protocol server. The method and system may further allow the BOOTP relay function of existing routers to be used for Dynamic Host Configuration Protocol messages including a request for a network address for a secondary network address server. Thus, a secondary network address server can use virtually any application protocol and virtually any port number for communications without having to be on a same subnet as network device clients.

However, the present invention is not limited to such exemplary embodiments, and the present invention can be used to acquire virtually any type of primary network addresses and secondary network address from virtually any type of primary network address server or secondary network address servers.

The method and system of the present invention may allow allocating multiple types of network addresses for multiple address networks. The method and system may also allow existing primary network address servers and new secondary network address servers to be reached via routers without any changes to any existing routers in existing networks.

The foregoing and other features and advantages of a preferred embodiment of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein:

FIG. 5 is a flow diagram illustrating a method for address server redirect at a client network device; and FIG. 6 is a flow diagram illustrating a method for address server redirect at a network address server.

DETAILED DESCRIPTION OF PREFERRED EMBODIMENTS

Exemplary Network System

Figure 1:
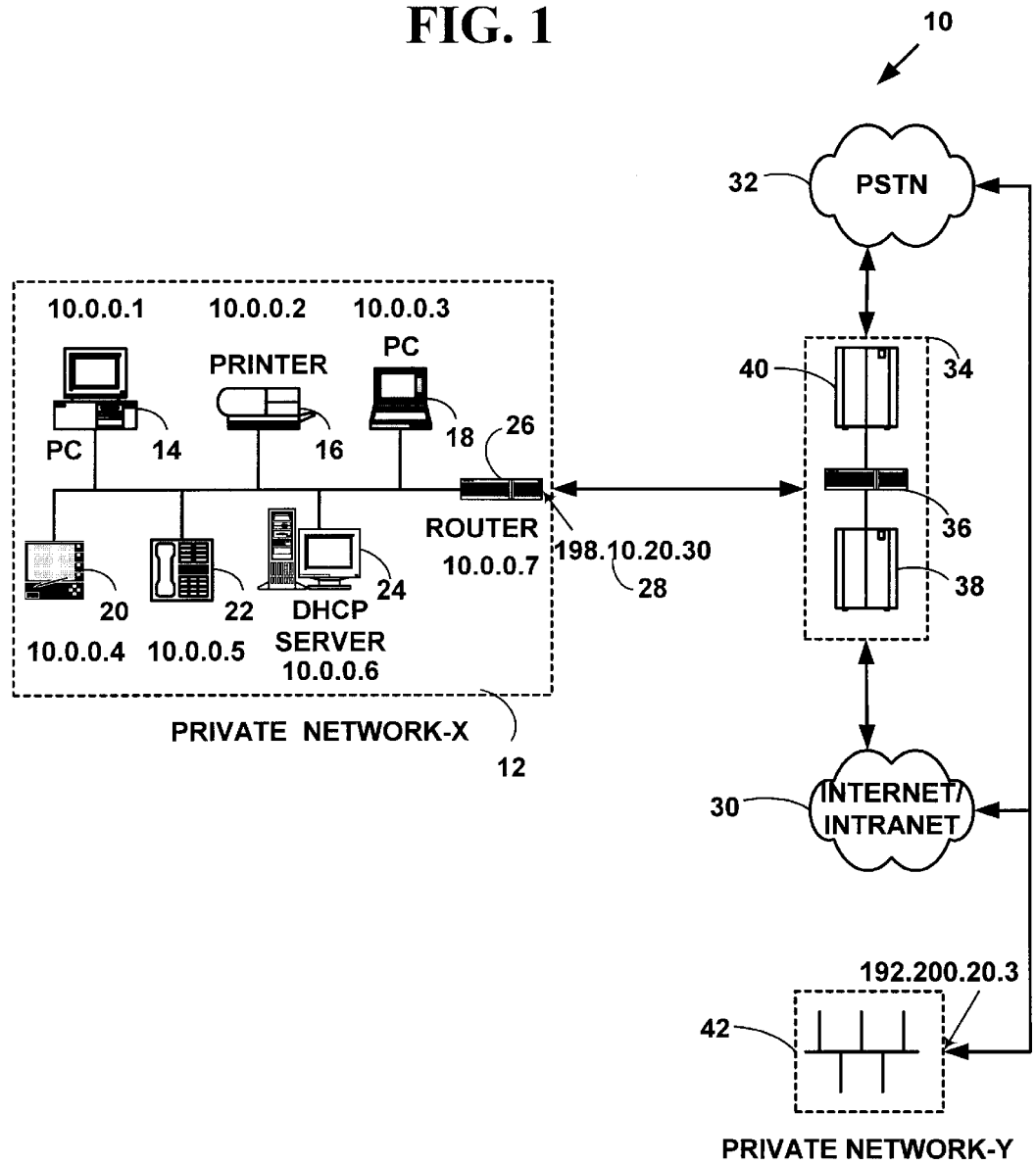
FIG. 1 is a block diagram illustrating an exemplary network system.

FIG. 1 is a block diagram illustrating an exemplary network system 10 for one preferred embodiment of the present invention. The network system 10 includes a first private computer network-x 12 with multiple network devices (14, 16, 18, 20, 22) and a router 26 to route data packets to another external computer network. The multiple network devices include any of computers (14, 18), printers 16, hand-held devices 20, telephones 22 or other network devices not illustrated in FIG. 1. The first computer network-x also includes a Dynamic Host Configuration Protocol ("DHCP") server 24. As is known in the art, the Dynamic Host Configuration Protocol is a protocol for passing network addresses such as Internet Protocol addresses and configuration information to network devices on a network. Use of DHCP is explained below.

The first computer network-x 12 has an external common network address 28 (e.g., a global Internet Protocol address, 198.10.20.30) to identify the first private computer network-x 12 to an external computer network such as a second computer network 30 and/or a third computer network 32 external to the first private computer network-x 12. The multiple network devices (14, 16, 18, 20, 22, 24 and 26) have a private internal network address (i.e., a private network address) on the first private computer network-x 12 (e.g., 10.0.0.x, etc.). In one preferred embodiment of the present invention, a network access service provider 34 with a router 36 routes data packets to/from the first private computer network-x 12 a public to second public computer network 30 and/or to a third public computer network 32 through a second network switch 38 and/or a third network switch 40. In another embodiment of the present invention, the first private computer network-x 12 is connected directly to the second computer network 30. The first private computer network-x 12 is also connected to a second private computer network-y 42 via public computer networks 30 or 32. The second private computer network-y 42 is also a private computer network that includes multiple network devices (not illustrated in FIG. 1) that use private internal network addresses behind a public globally routable network address (e.g., a global Internet Protocol address 192.200.20.3).

In one preferred embodiment of the present invention, the first private computer network-x 12 is a Small Office/Home Office ("SOHO") Local Area Network ("LAN"), also called a "legacy" LAN. The first private computer network 12 can also be a "stub" network or a sub-network ("subnet"). As is known in the art, a stub network typically includes multiple network devices using a common external network address to communicate with an external network such as the Internet. As is known in the art, a subnet is a smaller part of a larger network that uses a common addressing scheme (e.g., Internet Protocol addresses). The second network 30 is the Internet or an intranet, and the third network 32 is a Public Switched Telephone Network ("PSTN"). The second private-network-y 42 is also a SOHO LAN, stub network or subnet. However, other network types and network components can also be used and the present invention is not limited to the network types and network components described for this preferred embodiment.

Network devices and routers for preferred embodiments of the present invention include network devices that can interact with network system 10 and network system 100 discussed below that are compliant with all or part of standards proposed by the Institute of Electrical and Electronic Engineers ("IEEE"), International Telecommunications Union-Telecommunication Standardization Sector ("ITU"), Internet Engineering Task Force ("IETF"), the Wireless Application Protocol ("WAP") Forum, and Data-Over-Cable-Service-Interface-Specification ("DOCSIS"), standards for Multimedia Cable Network Systems ("MCNS"). However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The WAP standards can be found at the URL "www.wap-forum.org." The DOCSIS standards can be found at the URL "www.cablemodem.com."

An operating environment for network devices and routers of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Exemplary Protocol Stack

Figure 2:
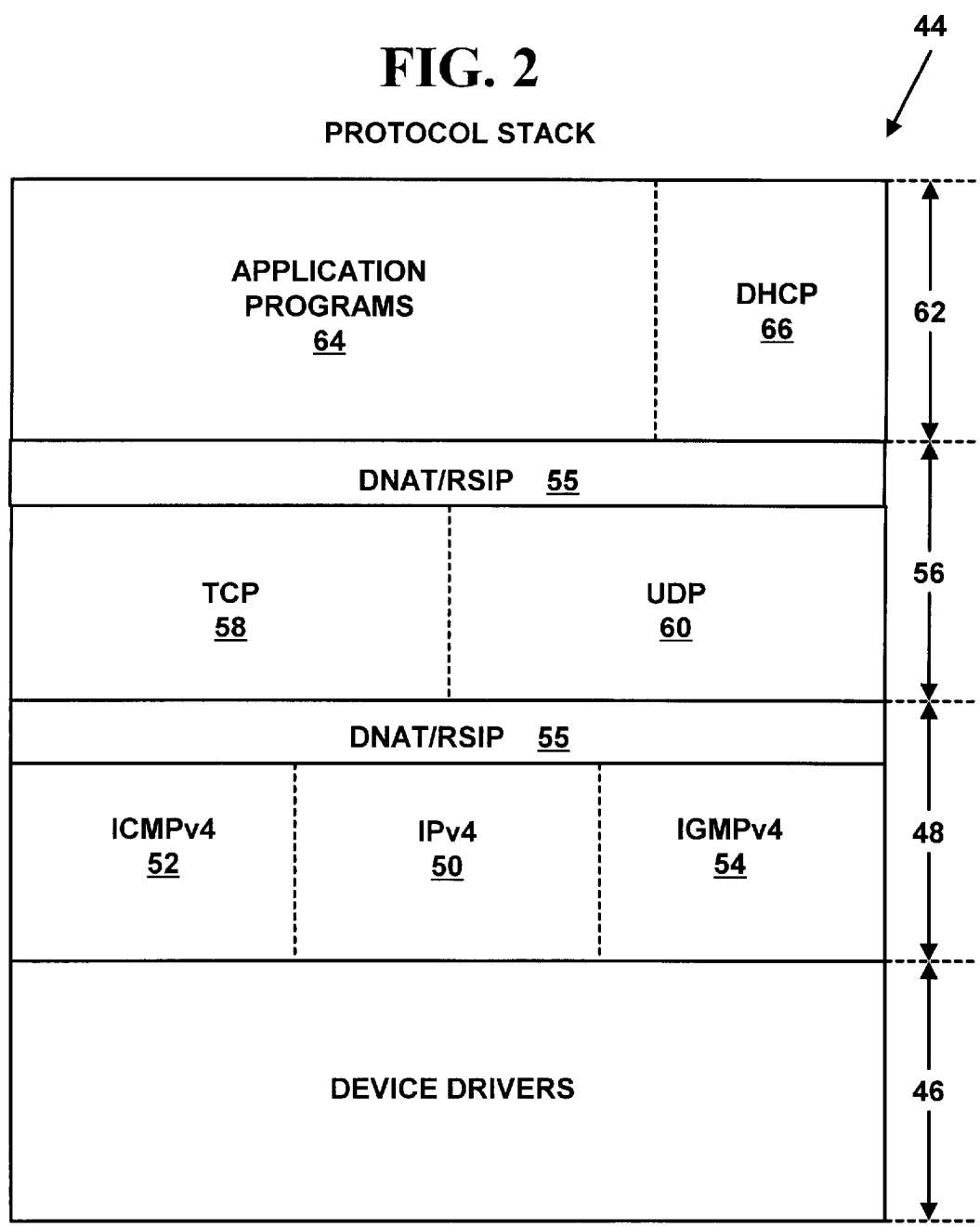
FIG. 2 is a block diagram illustrating a protocol stack for the network devices.
Figure 4:
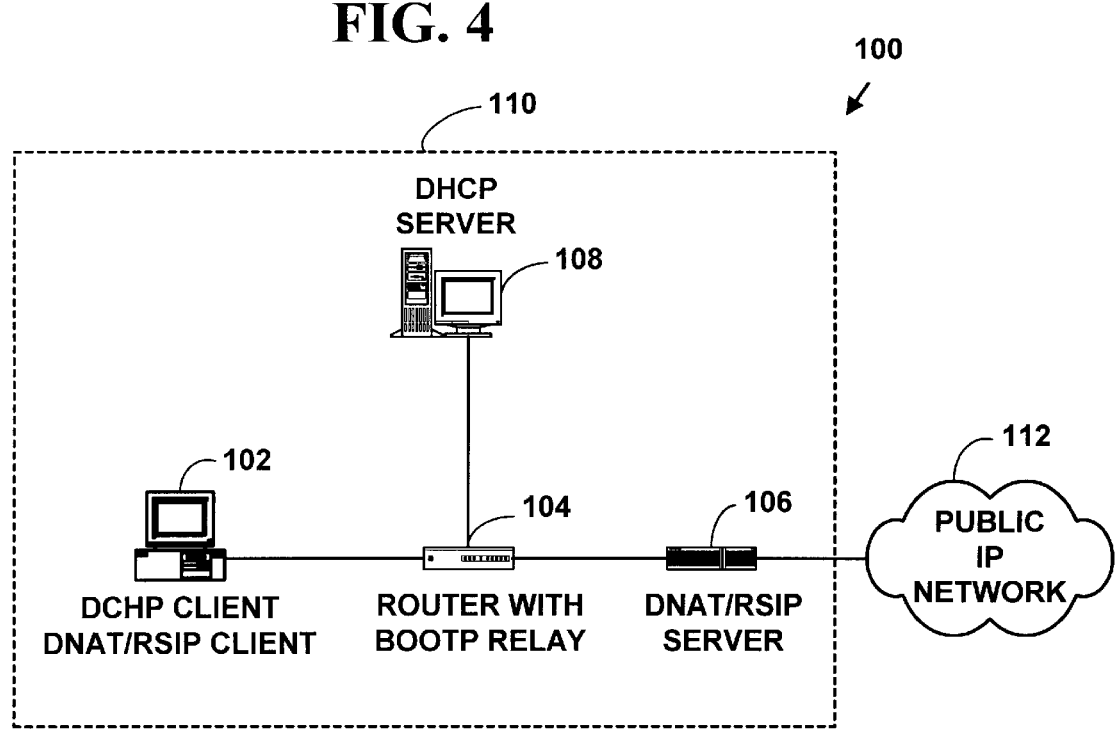
FIG. 4 is a block diagram illustrating an exemplary network system with address server redirect.

FIG. 2 is a block diagram illustrating an exemplary layered protocol stack 44 for network devices from the exemplary network system 10 (FIG. 1) and network system 100 (FIG. 4). The layered protocol stack 44 is described with respect to Internet Protocol suites comprising from lowest-to-highest, a link, network, transport and application layer. However, more or fewer layers could also be used, and different layer designations could also be used for the layers in the protocol stack 44 (e.g., layering based on the Open Systems Interconnection ("OSI") model).

The network devices (14, 16, 18, 20, 22, and 24) are connected to the first private computer network-x 12 and second private computer network-y 42 with Network Interface Card ("NIC") device drivers in a link layer 46 for the hardware network devices connecting the network devices to the computer network 12. The link layer 44 may include a Medium Access Control ("MAC") protocol layer or other data-link layer protocol.

Above the link layer 48 is a network layer 48 (also called the Internet Layer for Internet Protocol suites). The network layer 48 includes an IP layer 50. As is known in the art, IP 50 is an addressing protocol designed to route traffic within a network or between networks. IP layer 50, hereinafter IP 50, is described in IETF RFC-791, incorporated herein by reference. The network layer 48 also includes an Internet Group Management Protocol ("IGMP") layer 52, an Internet Control Message Protocol ("ICMP") layer 54.

ICMP layer 52, hereinafter ICMP 52, is used for Internet Protocol control. The main functions of ICMP 52 include error reporting, reachability testing (e.g., "pinging"), route-change notification, performance, subnet addressing and other maintenance. For more information on ICMP 52 see IETF RFC-792, incorporated herein by reference. IGMP layer 54, hereinafter IGMP 54, is responsible for multicasting. For more information on IGMP 54 see IETF RFC-1112, incorporated herein by reference.

The network layer 48 may also include an optional DNAT/RSIP layer 55. The DNAT/RSIP layer 55 is used to allocate locally unique ports as well as a combination network address including a locally unique port and a common external network address (e.g., an IP address) for a Distributed Network Address Translation server for communications with the external networks. For more information on the DNAT protocol, and the DNAT see co-pending U.S. application Ser. No. 09/035,600 incorporated herein by reference. DNAT is also called "Realm Specific Internet Protocol" ("RSIP") by the IETF. For more information on RSIP see, "Realm Specific IP Framework," by M. Borella and J. Lo, IETF draft, <draft-ieft-nat-rsip-framework-02.txt>, October 1999, and "Realm Specific IP: Protocol Specification," by M. Borella and J. Lo, IETF draft, <draft-ietf-nat-rsip-protocol-02.txt>, August 1999, both incorporated herein by reference.

Above network layer 48 is a transport layer 56. The transport layer 56 includes a Transmission Control Protocol ("TCP") layer 58 and a User Datagram Protocol ("UDP") layer 60, and may also include an optional DNAT/RSIP layer 55 described above.

The TCP layer 58, hereinafter TCP 58, provides a connection-oriented, end-to-end reliable protocol designed to fit into a layered hierarchy of protocols which support multi-network applications. TCP 58 provides for reliable inter-process communication between pairs of processes in network devices attached to distinct but interconnected networks. For more information on TCP 58 see IETF RFC-793, incorporated herein by reference.

The UDP layer 60, hereinafter UDP 60, provides a connectionless mode of communications with datagrams in an interconnected set of computer networks. UDP 60 provides a transaction oriented datagram protocol, where delivery and duplicate packet protection are not guaranteed. For more information on UDP 60 see IETF RFC-768, incorporated herein by reference. Both TCP 58 and UDP 60 are not required in protocol stack 42. Either TCP 58 or UDP 60 can be used without the other.

Above the transport layer 56 is an application layer 62 including application programs 64. The application programs 64 provide desired functionality to a network device (e.g., telephony or other communications functionality).

The application layer 56 includes a Dynamic Host Configuration Protocol ("DHCP") layer 66. The DHCP layer 66 is a used for requesting network addresses and configuration information on an IP 50 network. For more information on the DHCP layer 66 see, IETF RFC-1541, and RFC-2131 and RFC-2132, incorporated herein by reference.

The Dynamic Host Configuration Protocol ("DHCP")

As was illustrated in FIG. 2, network devices in the exemplary network system 10 include a Dynamic Host Configuration Protocol ("DHCP") layer 66, hereinafter DHCP 66. As was discussed above, DHCP 66 is used to dynamically allocate network addresses and provide configuration parameters to hosts on a network (e.g., an IP 50 network). DHCP 66 consists of two components: a protocol for delivering host-specific configuration parameters from a DHCP 66 server to a host and a mechanism for allocation of network host addresses to hosts. DHCP 66 is built on a client-server model, where designated DHCP 66 servers allocate network host addresses and deliver configuration parameters to dynamically configured network hosts clients.

Figure 3:
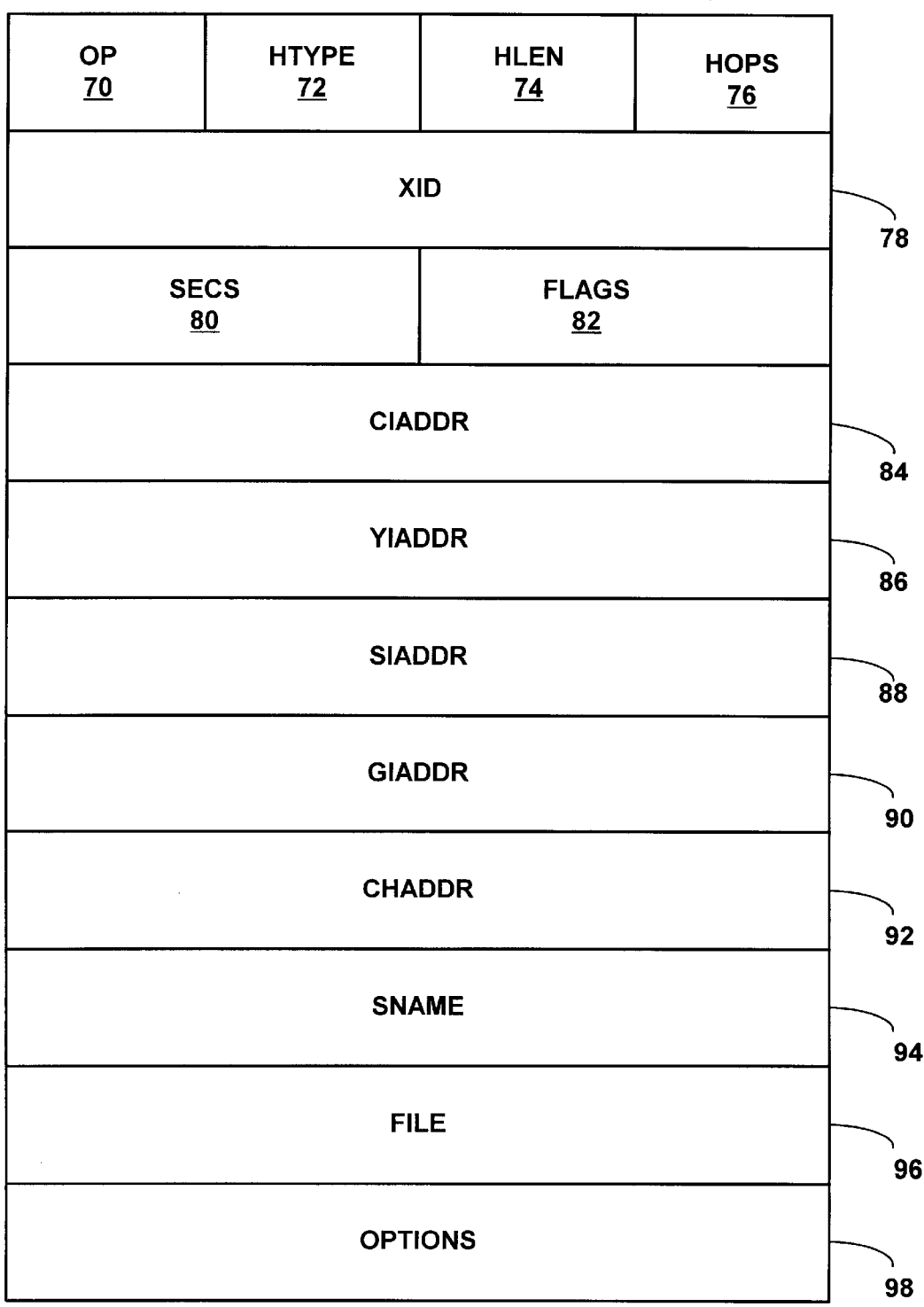
FIG. 3 is block diagram illustrating a Dynamic Host Configuration Protocol message structure.

FIG. 3 is a block diagram illustrating an exemplary DHCP 66 message structure 68. The format of the DHCP 66 messages is based on the format of BOOTstrap Protocol ("BOOTP") messages described in IETF RFC-951 and RFC-1542, incorporated herein by reference. From a network host client's point of view, the DHCP 66 is an extension of the BOOTP mechanism. This behavior allows existing BOOTP clients to interpret with the DHCP 66 servers without requiring any change to network host clients' BOOTP initialization software. The DHCP 66 provides persistent storage of network parameters for network host clients.

To capture BOOTP relay agent behavior described as part of the BOOTP specification and to allow interoperability of existing BOOTP clients with the DHCP 66 servers, the DHCP 66 server uses a BOOTP message format. Using BOOTP relaying agents eliminates the necessity of having a DHCP 66 server on each physical network segment.

DHCP 66 message structure 68 includes an operation code field 70 ("op"), a hardware address type field 72 ("htype"), a hardware address length field 74 ("hlen"), a number of hops field 76 ("hops"), a transaction identifier field 78 ("xid"), a seconds elapsed time field 80 ("secs"), a flags field 82 ("flags"), a client IP address field 84 ("ciaddr"), a your IP address field 86 ("yiaddr"), a server IP address field 88 ("siaddr"), a gateway/relay agent IP address field 90 ("giaddr"), a client hardware address field 92 ("chaddr"), an optional server name field 94 ("sname"), a boot file name 96 ("file") and an optional parameters field 98 ("options"). Descriptions for an exemplary DHCP 66 message 68 fields are shown in Table 1.

TABLE 1

| DHCP 66 Parameter | Description |
|---|---|
| OP 70 | Message op code/message type. 1=BOOTREQUEST, 2=BOOTREPLY. |
| HYTYPE 72 | Hardware address length (e.g., '1' = 10 Mps Ethernet). |
| HLEN 74 | Hardware address length (e.g. '6' for 10 Mbps Ethernet). |
| HOPS 76 | Client sets to zero, optionally used by relay-agents when booting via a relay-agent. |
| XID 78 | Transaction ID, a random number chosen by the client, used by the client and server to associate messages and responses between a client and a server. |
| SECS 80 | Filled in by client, seconds elapsed since client started trying to boot. |
| FLAGS 82 | Flags including a BROADCAST bit. |
| CIADDR 84 | Client IP 50 address; filled in by client in DHCPREQUEST if verifying previously allocated configuration parameters. |
| YIADDR 86 | 'Your' (client) IP address. |
| SIADDR 88 | IP 50 address of next server to use in bootstrap; returned in DHCPOFFER, DHCPACK and DHCPNAK by server. |
| GIADDR 90 | Gateway relay agent IP 50 address, used in booting via a relay-agent. |
| CHADDR 92 | Client hardware address (e.g., MAC laddress). |
| SNAME 94 | Optional server host name, null terminated string. |
| FILE 96 | Boot file name, terminated by a null string. |
| OPTIONS 98 | Optional parameters. |

The DHCP 66 message structure shown in FIG. 3 is used to discover IP 50 addresses and other network and configuration parameters in exemplary network system 10. A network host client 14, 16, 18, 22, 20 uses DHCP 66 to dynamically acquire or verify an IP 50 address and network and configuration parameters via the DHCP 66 server 24. Table 2 illustrates a typical use of the DHCP 66 protocol to discover a network address from a DHCP 66 server from a network host client.

TABLE 2

1. A network host client broadcasts a DHCPDISCOVER message on its local physical subnet. The DHCPDISCOVER message may include options that suggest values for a network host interface address. BOOTP relay agents (e.g., a router) may pass the message on to DHCP 66 serves not on the same physical subnet.
2. DHCP servers may respond with a DHCPOFFER message that includes an available network address in the 'yiaddr' field (and other configuration parameters). DHCP 66 servers unicasts the DHCPOFFER message to the network host client (using the DHCP/BOOTP relay agent if necessary) if possible, or may broadcast address (preferably 255.255.255.255) on the client's subnet.
3. The network host client receives one or more DHCPOFFER messages from one or more DHCP 66 servers. The network host client may choose to wait for multiple responses.
4. The network host client chooses one DHCP 66 server from which to request a network address and configuration parameters, based on the configuration parameters offered in the DHCPOFFER messages.
5. The network host client sends a DHCPREQUEST message to the selected DHCP 66 server to request one available network address and configuration parameters from a selected DHCP 66 server.
6. The selected DHCP 66 server responds to the network host client with a DHCPACK message indicating acknowledgment of the use of the available network address and configuration parameters.

As was discussed above, there is a need for multiple address networks; networks in which more than one type of network address is used. For example, a subnet that uses private IP 50 addresses for local communications and public IP 50 addresses for remote communications with network devices on the public IP 50 network such as the Internet or an intranet. As another example, a subnet may use 32-bit IPv4 IP 50 addresses for local communications and 64-bit IPv6 IP 50 addresses for remote communications.

A DHCP 66 server is typically used to allocate primary network addresses, such as IP 50 network addresses on a network. A DNAT or RSIP server may be used to allocate secondary network addresses on a network using a DNAT or RSIP protocol. The DNAT or RSIP protocols is used to allocate locally unique ports as well as a combination network address including a locally unique port and a common external network address (e.g., an IP address) for a Distributed Network Address Translation server for communications with the external networks.

As was discussed above, it is desirable to allow the use of multiple address servers to allocate multiple network addresses for network devices. In a preferred embodiment of the present invention, the multiple address servers are used without changes to any existing routers.

Exemplary Network System with Address Server Redirect

FIG. 4 is a block diagram illustrating an exemplary network system 100 for address server redirect for multiple network addresses. The exemplary network system 100 includes multiple DHCP/DNAT/RSIP clients 102, hereinafter client 102, a conventional router 104 with BOOTP/ DHCP 66 relay, a DNAT/RSIP server 106, a DHCP 66 server 108 on a private network 110 connected to a public IP 50 network 112 (e.g., the Internet or an intranet). The conventional router 104, the DNAT/RSIP server 106 and the DHCP 66 server 108 are illustrated as separate devices in FIG. 4. However, these three devices can also be combined and used as an integrated device in exemplary network system 100. The exemplary network system 100 is not limited to the network devices illustrate in FIG. 4 and more or fewer network devices and other types of network devices can also be used.

In one exemplary preferred embodiment of the present invention, the client 102 may be on a separate subnet from the DNAT/RSIP server 106 and/or the DCHP server 108 on the private network 110. In such an embodiment, the router 104 is used to route DHCP 66 messages to the DCHP server 108.

FIG. 4 also only illustrates one of each of the network devices. However, a typical network system with address server redirect includes tens to hundreds or thousands of clients 102 and potentially multiple conventional routers 104, DNAT/RSIP servers 106, and DHCP 66 servers 108.

The client 102 is any of the network devices 14, 16, 18, 20 or 22 or others, as described for FIG. 1. The router 104 is any conventional router supplied by Cisco Systems Incorporated, of San Jose, California, 3Com Corporation of Santa Clara, Calif. and others. The DNAT/RSIP server 106 is any of those provided by 3Com and others. The client 102 includes the protocol stack 44 illustrated in FIG. 2.

Address Server Redirect at a Client Network Device

FIG. 5 is a flow diagram illustrating a Method 114 for address server redirect at a client network device. At Step 116, a request message is created in a first protocol on a first network device to request a primary network address from a primary network address server on a private network. The primary network address is used by the first network device to communicate with other network devices on a first network. At Step 118, an option field is set in the request message to request an address of a secondary network address server. The secondary network address server is used to request a secondary network address that is used by the first network device to communicate with other network devices on a second network. At Step 120, the request message is sent from the first network device to the primary network address server to request the primary network address and the network address of the secondary network address server. The request message may travel through one or more routers on the first network. Method 114 also allows the BOOTP relay function of routers to be used for DHCP 66 messages so a secondary network address server can use virtually any application protocol and virtually any port number for communications without having to be on the same subnet as network device clients.

The first network device receives a response message with the first protocol from the primary network address server. The response message includes a primary network address for the first network device and a network address for a secondary network address server. A second request message is sent with a second protocol from the first network device to the secondary network address server to request a secondary network address. The secondary network address is used by the first network device to communicate with other network devices on a second network.

In on exemplary preferred embodiment of the present invention, the primary network address is a private IP 50 address and the secondary network address is a public IP 50 address.

In another exemplary preferred embodiment of the present invention, the primary network address is an Internet Protocol version-6 address and the secondary network address is an Internet Protocol version-4 address.

In one exemplary preferred embodiment of the present invention, Method 114 is used with exemplary network system 100 and with DHCP 66 server 108 and DNAT/RSIP servers 106 to allocate multiple network addresses. However, the present invention, is not limited to such an embodiment. Method 114 can be used to acquire virtually any type of primary network addresses and secondary network address from virtually any type of primary network address server or secondary network address servers.

In such an embodiment, at Step 116, a DHCP 66 request message is created on the client 102 to request a primary IP 50 address (e.g., a private IP 50 address) from the DHCP server 108 on the private network 110. The primary IP 50 address is used by the client 102 to communicate with other network devices on the private network 110.

At Step 118, a DHCP 66 option-98 field is set in the DHCP 66 request message on the client 102 to request an IP 50 address of the DNAT/RSIP server 106. The DNAT/RSIP server 106 is used to request a secondary IP 50 address (e.g., a public IP 50 address) that is used by the client 102 to communicate with other network devices on the IP 50 public network 112.

In one exemplary preferred embodiment of the present invention, a new DHCP 66 "ADDRESS SERVER REDIRECT" option is used in the DHCP 66 message option-field 98 (FIG. 3). Use of this option does not require any modifications in the router 104, or the DNAT/RSIP server 106. However, use of this new option does necessitate modifications to the DHCP server 108 and the DHCP 66 layer in client 102. In one embodiment of the present invention, the ADDRESS SERVER REDIRECT option includes two fields: a first field to request a type of secondary network address server; and a second field to include a network address for the requested type of secondary network address server. However, the present invention is not limited to this implementation and more or fewer fields can also be used in the ADDRESS SERVER REDIRECT option.

In one exemplary preferred embodiment of the present invention, the ADDRESS SERVER REDIRECT option is preferably included in a DHCPDISCOVER message (see Table 2). However, the ADDRESS SERVER REDIRECT may also be included instead in a DHCPREQUEST message. The DHCP 66 request messages are used to request a primary IP 50 address to a network host client such as client 102.

At Step 120, the DHCP 66 request message is sent from the client 102 to the DHCP server 108 to request the primary IP 50 address and the IP 50 address of the DNAT/RSIP server 106. The DHCP 66 request message may travel through one or more routers 104 on the private network 110.

The client 102 receives a DHCP 66 response message with from the DHCP 66 server 108. The DHCP 66 response message includes a primary IP 50 address for the client 102 and an IP 50 address for the DNAT/RSIP server 106. In one exemplary preferred embodiment of the present invention, the client 102 receives a DHCPOFFER message (see Table 2) including the primary IP 50 address and an IP 50 address for the DNAT/RSIP server 106. In another embodiment of the present invention, the client 102 receives the primary IP 50 address and an IP 50 address for the DNAT/RSIP server 106 in a DHCPACK message (see Table 2).

In one exemplary preferred embodiment of the present invention, a DNAT/RSIP request message is sent with from the client 102 to the DNAT/RSIP server 106 to request a secondary IP 50 address. However, other secondary network address protocols can also be used and the present invention is not limited to the DNAT/RSIP protocols. The secondary IP 50 address is used by the client 102 to communicate with other network devices on the public network 112.

In one exemplary preferred embodiment of the present invention, the secondary IP 50 address is a combination network address including a common public IP 50 address and a locally unique port used for DNAT/RSIP to uniquely identify the client 102 on the private network 110. However, other secondary network addresses can also be used and the present invention is not limited such to DNAT/RSIP secondary addresses.

Address Server Redirect at a Network Address Server

FIG. 6 is a flow diagram illustrating a Method 122 for address server redirect at a network address server. At Step 124, a table of network addresses of secondary network servers is maintained on a primary network address server. The secondary network address servers are used to allocate secondary network addresses to network devices on a first network. The secondary network addresses are used by a network device to communicate with other network devices on a second network. At Step 126, a request message for a primary network address is received on the primary network address server from a first network device on a first network with a first protocol. The primary network address is used by the first network device to communicate with other network devices on the first network. At Step 128, a primary network address allocated for the first network device is added to a response message. At Step 130, a test is conducted to determine whether the request message includes an option field including an option to request an address of a secondary network address server.

If the request message includes the option field, at Step 132, a network address of a secondary network address server from the table is added to the option field including in the response message. The network address is used by the first network device to locate a secondary network address server that supplies a secondary network address that is used by the first network device to communicate with other network devices on the second network. At Step 134, the response message is sent to the first network device including the primary network address and the network address of the secondary network address server in the option field. The response message may travel through one or more routers.

If the request message does not include the option field, at Step 136, the response message is sent to the first network device including only the primary network address allocated by the primary network address server and not a network address for a secondary network address server.

In one exemplary preferred embodiment of the present invention, Method 122 is used with exemplary network system 100 and with the DHCP 66 server 108 and the DNAT/RSIP server 106 to allocate multiple network addresses. However, the present invention, is not limited to such an embodiment. Method 122 can be with virtually any type of primary network address server or secondary network address server.

In such an embodiment at Step 124, a table of IP 50 addresses for DNAT/RSIP servers 106 is maintained on the DHCP server 108. However, the table may also include network addresses for other secondary network address servers and the present invention is not limited to a table of network address DNAT/RSIP servers 106. At Step 126, a DHCP 66 request message for a primary IP 50 address is received on the DHCP server 108 from the client 102 on the private network 110. In one exemplary preferred embodiment of the present invention, the DHCP 66 request message is a DHCPDISCOVER message (see Table 2). However, the DHCP 66 request message may also be a DHCPREQUEST message.

At Step 128, a primary IP 50 address allocated for the client 102 is added to a DHCP response message in the DHCP 66 yiaddr-field 86. At Step 130, a test is conducted to determine whether the DHCP 66 request message includes a DHCP 66 message option-field 98 with a DHCP 66 ADDRESS SERVER REDIRECT option.

If the DHCP 66 request message includes the DHCP 66 ADDRESS SERVER REDIRECT option, at Step 132, an IP 50 address of a DNAT/RSIP server 160 from the table is added to a DHCP 66 option-field 98 for ADDRESS SERVER REDIRECT in the DHCP 66 response message. In one exemplary preferred embodiment of the present invention, the DHCP 66 response message is a DHCPOFFER message (see Table 2). However, the DHCP 66 response message may instead be a DHCPACK message.

At Step 134, the DHCP 66 response message is sent to the client 102 including the primary IP 50 address and the IP 50 address of the DNAT/RSIP server 106 in a DHCP 66 option-field 98 for ADDRESS SERVER REDIRECT. The DCHP response message 102 may travel through one or more routers 104 on the private network 110.

If the DHCP 66 request message does not include the option field, at Step 136, the DHCP 66 response message is sent to the client 102 including only the primary IP 50 network address allocated by the DHCP server 108 and not an IP 50 address for a DNAT/RSIP server 106.

The method and system described herein can be used to acquire virtually any type of primary network addresses and secondary network address from virtually any type of primary network address server or secondary network address servers. The method and system allow multiple types of network addresses for multiple address networks to be allocated. The method and system may also allow existing DHCP 66 servers 108 and new secondary network address servers such as DNAT/RSIP servers 106 to be reached via routers without any changes to any existing routers in existing networks. The method and system also allows the BOOTP relay function of existing routers to be used for DHCP 66 messages. Thus, a secondary network address server can use virtually any application protocol and virtually any port number for communications without having to be on a same subnet as network device clients.

It should be understood that the programs, processes, methods, systems and/or apparatus described herein are not related or limited to any particular type of computer apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used and visa-versa.

In view of the wide variety of embodiments to which the principles of the invention can be applied, it should be understood that the illustrative embodiments are exemplary only, and should not be taken as limiting the scope of the present invention. For example, the steps of the flow diagrams may be taken in sequences other than those described, and more or fewer elements or component may be used in the block diagrams. The claims should not be read as limited to the described order or elements unless stated to that effect. Therefore, all embodiments that come within the scope and spirit of the following claims and equivalents thereto are claimed as the invention.

We claim:

1. In a first network with a plurality of network devices connected to a second network, a method of allocating primary network addresses and secondary network addresses, comprising the steps of:

creating a request message in a first protocol on a first network device to request a primary network address from a primary network address server on a first network, wherein the primary network address is used by the first network device to communicate with other network devices on a first network;

setting an option field in the request message to request an address of a secondary network address server, wherein the secondary network address server is used to request a secondary network address that is used by the first network device to communicate with other network devices on a second network; and sending the request message from the first network device to the primary network address server to request the primary network address and the network address of the secondary network address server.

2. A computer readable medium have stored therein instructions for causing a central processing unit to execute the method of claim 1.

3. The method of claim 1 further comprising:

receiving a response message with the first protocol from the primary network address server, wherein the response message includes a primary network address for the first network device and a network address for a secondary network address server; and sending a second request message with a second protocol from the first network device to the secondary network address server to request a secondary network address, wherein the secondary network address that is used by the first network device to communicate with other network devices on a second network.

4. The method of claim 1 wherein the request message is any of a Dynamic Host Configuration Protocol discover or a Dynamic Host Configuration Protocol request message.

5. The method of claim 1 wherein the primary network address server is a Dynamic Host Configuration Protocol address server.

6. The method of claim 1 wherein the primary network address is a private Internet Protocol address.

7. The method of claim 1 wherein the secondary network address server is any of a Distributed Network Address Translation server or a Realm Specific Internet Protocol server.

8. The method of claim 1 wherein the secondary network address is a public Internet Protocol address.

9. The method of claim 1 wherein the secondary network address is a combination network address including a common public Internet Protocol address and a locally unique port used for Distributed Network Address Translation or Realm Specific Internet Protocol to uniquely identify the first network device.

10. The method of claim 1 wherein the step of setting an option field in the request message includes setting a Dynamic Host Configuration Protocol option field with an address server redirect option.

11. The method of claim 3 wherein the response message is any of a Dynamic Host Configuration Protocol offer or a Dynamic Host Configuration Protocol acknowledgment message.

12. The method of claim 3 wherein the second protocol is any of a Distributed Network Address Translation protocol or a Realm Specific Internet Protocol.

13. The method of claim 1 wherein the primary network address is an Internet Protocol version-4 address and the secondary network address is an Internet Protocol version-6 address.

14. In a first network with a plurality of network devices connected to a second network, a method of allocating primary network addresses and secondary network addresses, comprising the steps of:

maintaining a table of network addresses for secondary network servers on a primary network address server, wherein the secondary network address servers are used to allocate secondary network addresses to network devices on a first network, wherein the secondary network addresses are used by a network device to communicate with other network devices on a second network;

receiving a request message for a primary network address on the primary network address server from a first network device on a first network with a first protocol, wherein the primary network address is used by the first network device to communicate with other network devices on the first network;

adding a primary network address allocated for the first network device to a response message;

determining whether the request message includes an option field including an option to request an address of a secondary network address server, and if so, adding a secondary network address server network address from the table to an option field included in the response message, wherein the secondary network address server network address in the option field is used by the first network device to locate a secondary network address server that supplies a secondary network address that is used by the first network device to communicate with other network devices on the second network; and sending the response message to the first network device including the primary network address and the secondary network address server network address in the option field.

15. A computer readable medium have stored therein instructions for causing a central processing unit to execute the method of claim 14.

16. The method of claim 14 wherein the option is a Dynamic Host Configuration Protocol message option for address server redirect.

17. The method of claim 14 wherein the secondary network address includes an Internet Protocol address for a Distributed Network Address Translation server.

18. The method of claim 14 wherein the primary network address includes a private Internet Protocol address.

19. The method of claim 14 wherein the request message includes any of a Dynamic Host Configuration Protocol discover message or a Dynamic Host Configuration Protocol request message.

20. The method of claim 14 wherein the response message includes of any Dynamic Host Configuration Protocol offer message or a Dynamic Host Configuration Protocol acknowledgment message.

21. The method of claim 14 further comprising:

determining whether the request message includes an option field including an option to request an address of a secondary network address server, and if not, sending the response message to the first network device including only the primary network address allocated by the primary network address server and not a network address for a secondary network address server.

22. A multi-address network system, comprising in combination:

a primary network address server for allocating a primary network address with a first protocol and for supplying a secondary network address server network address with the first protocol, a secondary network address server for allocating a secondary network address; and a client network device for communicating with other network devices on a first network and for communicating with other network devices on a second network, wherein the primary network address is used to identify the client network device for communication with other network devices on the first network, and wherein the secondary network address server network address is used by the client network device to request a secondary network address from a secondary network address server, and wherein the secondary network address is used to identify the client network device for communication with other network devices on the second network.

23. The system of claim 22 wherein the first protocol is a Dynamic Host Configuration Protocol.

24. The system of claim 22 wherein the primary network address server is a Dynamic Host Configuration Protocol server and the secondary network address server is a Distributed Network Address Translation server.

* * * * *